United States Patent
Fletcher et al.

(10) Patent No.: US 8,548,436 B2
(45) Date of Patent: Oct. 1, 2013

(54) AVOIDING REDUNDANT TRANSMISSIONS OF DATA DURING MULTIMEDIA MOBILE PHONE COMMUNICATIONS

(75) Inventors: Benjamin J. Fletcher, Winchester (GB); Matthew N. Sunley, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/586,665

(22) Filed: Aug. 15, 2012

(65) Prior Publication Data
US 2012/0309360 A1  Dec. 6, 2012

Related U.S. Application Data

(63) Continuation of application No. 12/114,561, filed on May 2, 2008, now Pat. No. 8,346,218.

(51) Int. Cl.
*H04L 12/58* (2006.01)
(52) U.S. Cl.
USPC ............... 455/412.1; 455/550; 455/412.2; 455/414.3

(58) Field of Classification Search
USPC ................ 455/550, 412.1, 412.2, 414.3
See application file for complete search history.

(56) References Cited

U.S. PATENT DOCUMENTS

| | | | |
|---|---|---|---|
| 7,113,773 | B2 | 9/2006 | Quick, Jr. et al. |
| 7,269,601 | B2 | 9/2007 | Kinno et al. |
| 2004/0242203 | A1 | 12/2004 | Lipsanen et al. |
| 2006/0008256 | A1 | 1/2006 | Khedouri et al. |
| 2008/0250328 | A1 | 10/2008 | Konttinen |
| 2009/0028142 | A1 | 1/2009 | Schmidt et al. |

*Primary Examiner* — David Q Nguyen
(74) *Attorney, Agent, or Firm* — Cuenot, Forsythe & Kim, LLC

(57) ABSTRACT

A method, apparatus, and computer product for avoiding redundant data transmissions during communication via multimedia mobile phones. In operation, a sending party inquires whether intended for transmission data already resides in a mobile phone of a receiving party Depending on a content of the response from the receiving party, the sending party transmits the data or a request for displaying the already available data.

15 Claims, 3 Drawing Sheets

AVOIDING REDUNDANT TRANSMISSIONS OF DATA DURING MULTIMEDIA MOBILE PHONE COMMUNICATIONS

CROSS-REFERENCE TO RELATED APPLICATIONS

This application is a Continuation of U.S. application Ser. No. 12/114,561, filed on May 2, 2008.

BACKGROUND

1. Technical Field

The present invention generally relates to mobile communications and, in particular, to techniques for avoiding redundant data transmissions during multimedia mobile phone communications.

2. Description of the Related Art

Data transfers between mobile phones are associated with transmission costs, which increase with the amounts of transferred information. These costs are specifically significant during transmissions of multimedia messages including large data files, such as music, pictures, video clips, and the like.

Conventionally, the transmission costs are controlled by imposing quotas on usage of communication resources, such as quotas on the user's transmission costs and/or airtime. However, this approach has proved to be ineffective and difficult to manage or implement.

Therefore, further improvements in data transmissions during multimedia mobile phone communications are desirable.

SUMMARY OF ILLUSTRATIVE EMBODIMENTS

Disclosed are a method, apparatus, and computer product for avoiding redundant data transmissions during multimedia mobile phone communications.

In embodiments of the present invention, during a transmission of data (for example, textual, audio, graphics, or video data), a sending party inquires if a receiving party already has the intended data being stored in their multimedia mobile phone. If the inquiry is answered affirmatively, the data is retrieved and displayed at the receiving party. Otherwise, the sending party transmits the data to the receiving party.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
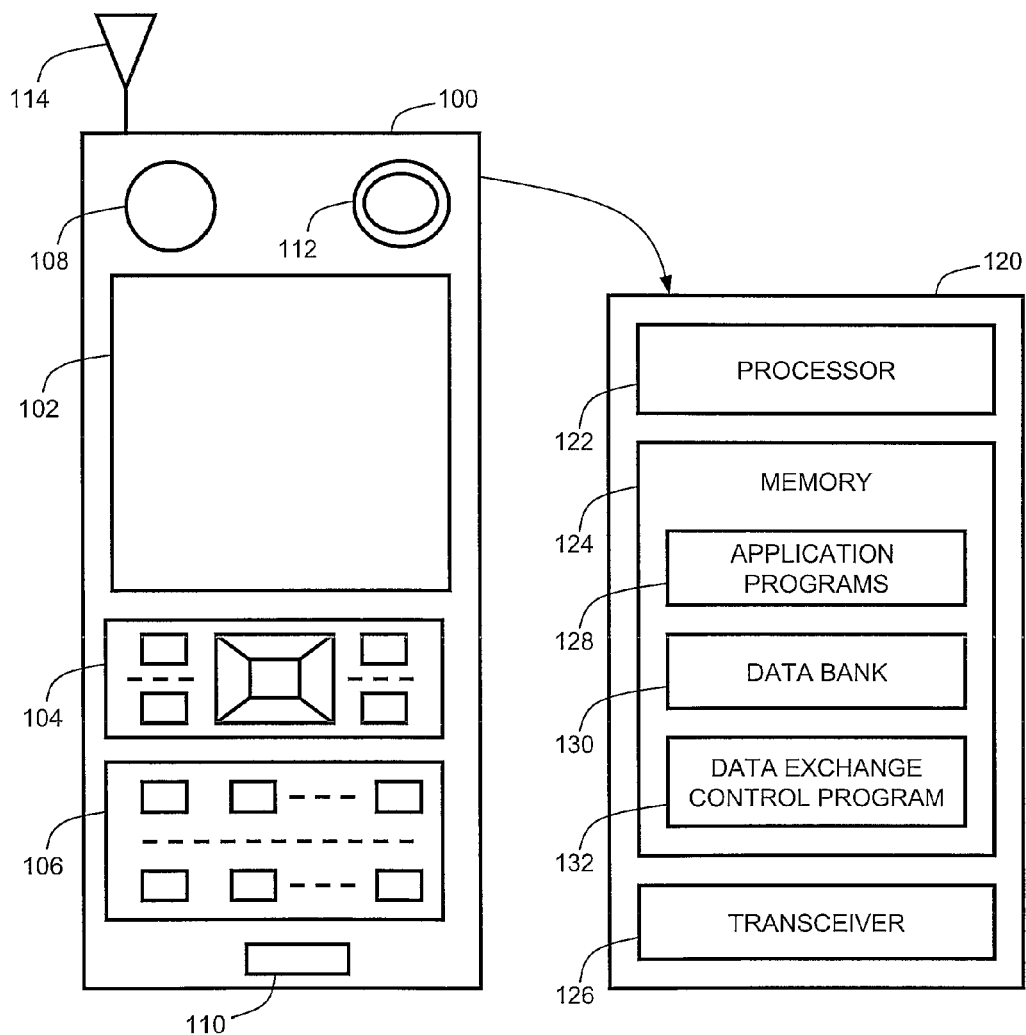
FIG. 1 is a block diagram of an exemplary multimedia mobile phone configured for implementing one or more embodiments of the invention.

The illustrative embodiments provide a method, apparatus, and computer product for avoiding redundant data transmissions during multimedia mobile phone communications.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s), except that suffixes may be added, when appropriate, to differentiate such elements. The specific numerals assigned to the elements are provided solely to aid in the description and not meant to imply any limitations (structural or functional) on the invention. Each term utilized herein is to be given its broadest interpretation given the context in which that term is utilized. Specifically, as utilized herein, the term "multimedia mobile phone" broadly refers to devices or portions thereof having wireless multimedia communicating capabilities, and the term "data" broadly refers to digitized voice, text, graphics, and video information or a combination thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to the figures, FIG. 1 depicts a block diagram of exemplary multimedia mobile phone (MMP) 100 comprising text/graphics/video-enabled display 102, user controls 104, alphanumerical keypad 106, speaker(s) 108 (one speaker is shown), microphone 110, still/video camera 112, antenna 114, and electronic system 120. Electronic system 120 facilitates operability of MMP 100 and, illustratively, includes processor 122, memory 124, and transceiver 126 coupled to antenna 128. Memory module 124 generally comprises a module containing codes of application programs 128, data bank 130 of data being stored in MMP 100, and a module containing code of program data exchange control (DEC) program 132. In operation, DEC program 132 decreases an amount of redundant data transmissions to/from MMP 100.

MMP 100 may, for example, be a cellular phone, a laptop computer, or Personal Digital Assistant (PDA) having multimedia wireless communicating capabilities, and the like mobile communicating device. Transceiver 126 is configured for supporting incoming and outgoing transmissions between MMP 100 and other mobile communicating device. Memory 124 may comprise, but is not limited to, cache memory, random access memory (RAM), read only memory (ROM), firmware memory, registers, and buffers, among other storage elements.

DEC program 132 is illustrated and described herein as a stand-alone (i.e., separate) software/firmware component, which is saved in memory 124 and provides or supports the specific novel functions discussed below. In alternate embodiments, at least portions of DEC program 132 may be combined with other software modules incorporating functionality of their respective components.

In one illustrative embodiment, DEC program 132 decreases an amount of redundant data transmissions to/from MMP 100 and, as such, decreases bandwidth/airtime requirements of MMP 100. In particular, syntax of DEC program 132 allows to identify, retrieve, and display data that is already available at a particular MMP 100 (for example, data residing in data bank 130 of memory 124).

Among the software code/instructions provided by DEC program 132 and which are specific to the invention, are: (a) code for performing, at a sending party during a transmission of the data to a receiving party, the steps of: (i) transmitting an inquiry of whether a receiving party already has the data, (ii) in determination that the receiving party already has the data, retrieving and displaying the data at the receiving party, and (iii) in determination that the receiving party does not have the data, transmitting the data to the receiving party; (b) code for performing, at the receiving party in a response to the transmission from the sending party, the step of responding to the inquiry; and (c) code for performing, at a requesting party, during a download of the data from a website, the steps of (i) responding to an inquiry if the data already resides at the requesting party, and (ii) in determination that the data resides at the requesting party, retrieving and displaying the data at the receiving party, otherwise downloading the data from the website.

For simplicity of the description, the collective body of the code that enables these various features is referred to herein as DEC program 132. According to the illustrative embodiment, when processor 122 executes DEC program 132, MMP 100 initiates a series of functional processes that enable the above functional features, as well as additional features/functionalities that are described below within the context of FIGS. 2A-2B and 3A-3C.

Those of ordinary skill in the art will appreciate that hardware configurations depicted in FIG. 1 may vary. For example, other hardware components may be used in addition to or in place of the depicted components. The multimedia mobile phone 100 depicted in FIG. 1 may, for example, be a portion of a larger wireless multimedia communicating device or computing device having multimedia wireless communicating capabilities (e.g., PDA, laptop computer, and the like), as well as may incorporate some of such devices or portions thereof. Therefore, the architecture depicted in FIG. 1 is a basic illustration of a multimedia mobile communicating device, for which actual implementations may vary. Thus, the depicted example is not meant to imply architectural limitations with respect to the present invention.

Figures 2A, 2B:
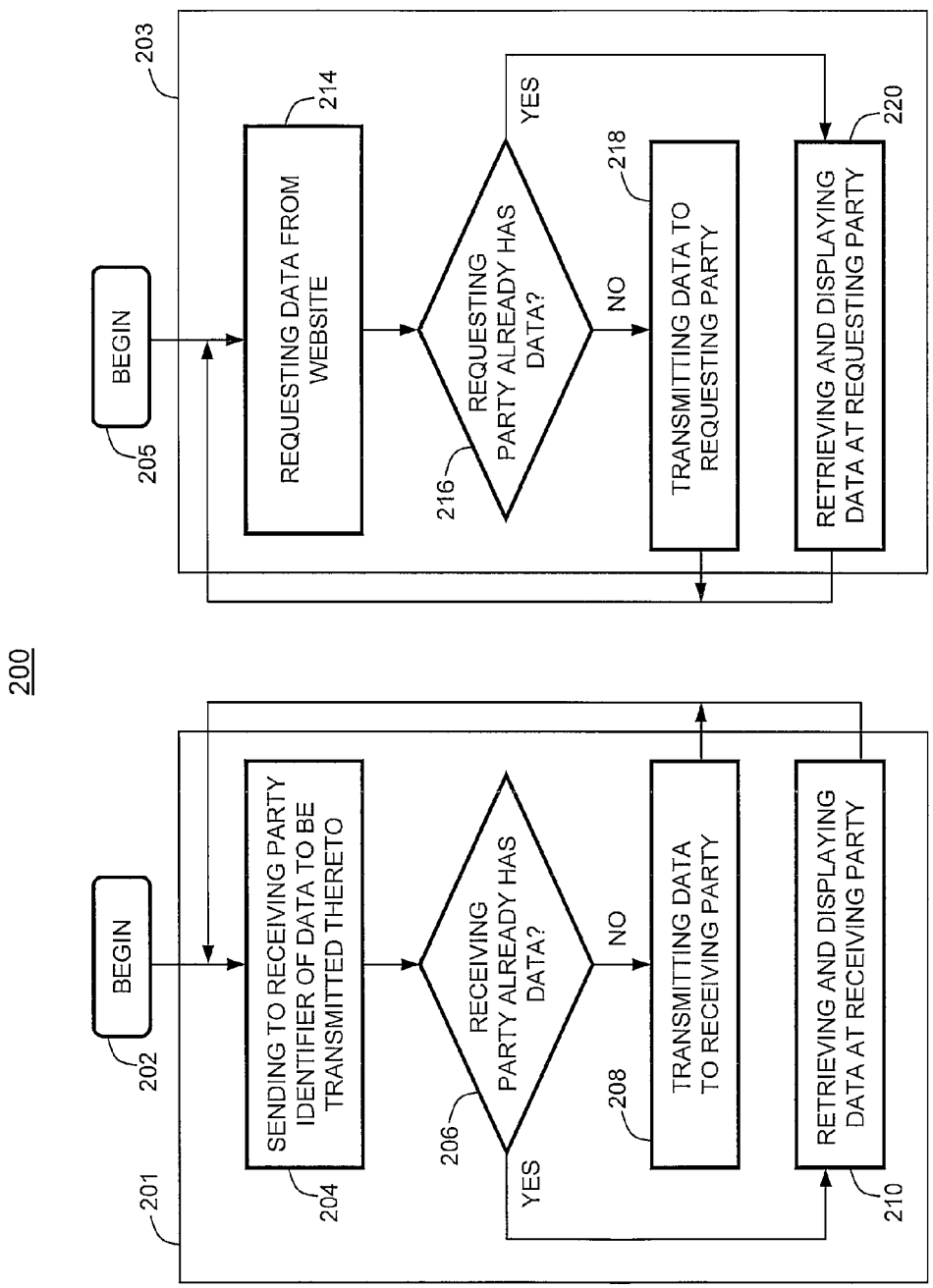
FIGS. 2A-2B are flow charts of portions of a process by which the features of the invention are implemented, according to one embodiment of the invention.
Figure 3A:
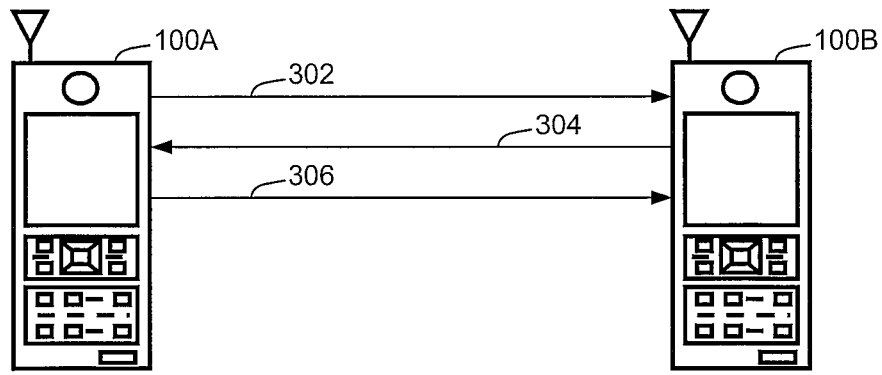
FIGS. 3A-3C are functional diagrams illustrating embodiments of the invention.
Figure 3B:
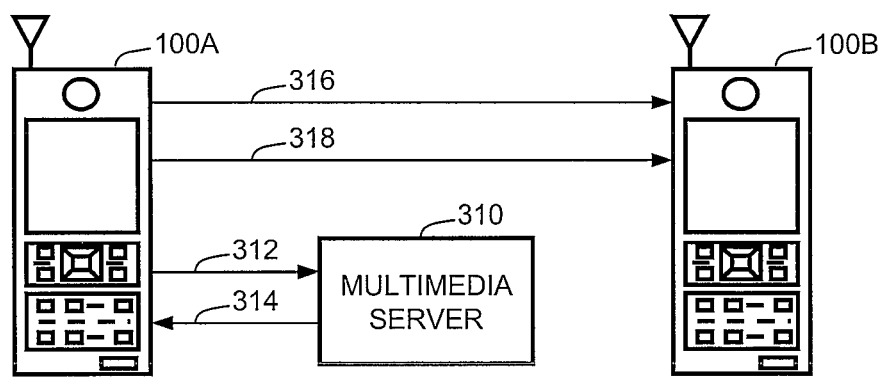
Figure 3C:
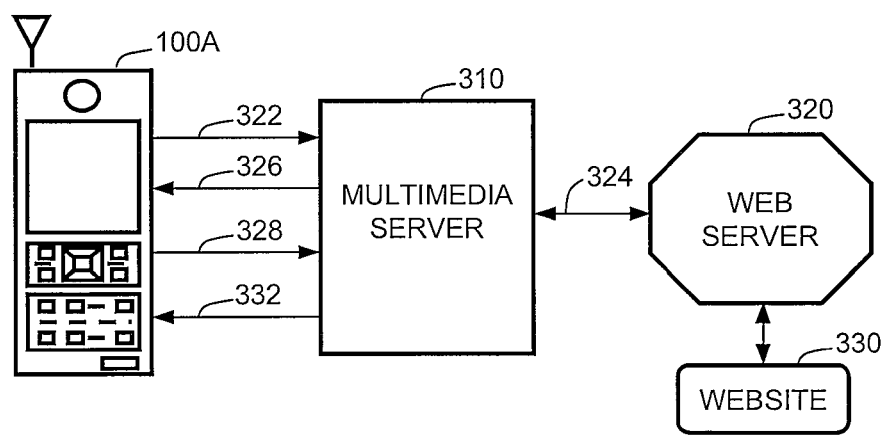

With reference now to FIGS. 2A-2B and 3A-3C, therein are described illustrative embodiments of the invention. FIGS. 2A-2B depict flow charts of portions of process 200 by which methods of the illustrative embodiments are completed, and FIGS. 3A-3C depict functional diagrams illustrating embodiments of the invention. Although the features illustrated in FIGS. 2A-2B and 3A-3C may be described with reference to MMP 100 and components thereof shown in FIG. 1, it should be understood that this is merely for convenience and alternative components and/or configurations can be employed when implementing embodiments of the invention. To best understand the invention, the reader should refer to FIGS. 2A-2B and 3A-3C simultaneously.

Referring to FIGS. 2A-2B, key portions of process 200 may be completed by and described below in the context of DEC program 132, which is executed by processor 122 and controls specific operations of/in MMP 100A and components of networks accessible by MMP 100, such as MMP 100B, multimedia server (MS) 310, and web server 320 (all shown in FIGS. 3A-3C). Process 200 comprises sequences 201 (FIG. 2A) and 203 (FIG. 2B), which may be executed in an arbitrarily selected order.

During sequence 201, MMA 100A ("sending party") transmits multimedia data D1 to MMP 100B ("receiving party"). Referring to FIG. 2A, sequence 201 begins at block 202 and proceeds to block 204, where MMP 100A ("sending party") transmits an inquiry to determine whether the receiving party already has this data. The inquiry includes an identifier of data D1 intended for the transmission to MMP 100B.

Such an identifier is generally a representative element of data D1, such as a title of data D1, a name of a file containing data D1, a checksum of the file, a template used to organize/format data D1, textual/symbolic description of data D1, and the like. In most cases, the identifier is a portion of a text-only message, which may be transmitted to the receiving party using Short Message Sevice (SMS) communication protocol having minimal bandwidth requirements.

At block 206, process 200 queries if the receiving party already has all of the data D1. If the query is answered negatively, process 200 proceeds to block 208, in which data D1, or portions thereof, is transmitted from MMP 100A to MMP 100B. If the query is answered affirmatively, process 200 proceeds to block 210, in which data D1 is retrieved and displayed at MMP 100B without transmitting any of the data D1. Also, where the receiving party already has a portion of the data, only the absent/missing portions of the data are transmitted, thus avoiding a redundant transmission of data D1 from MMP 100A to MMP 100B. Upon completion of procedures of block 210, sequence 201 ends. According to one embodiment, during transmissions resulting from a sending mobile phone MMP 100A transmitting an outgoing requests for graphical/video data, the process involves: sending a checksum of the data to a receiving mobile phone MMP 100B; in response to determining that the sending mobile phone MMP 100A contains portions of the data (a) retrieving available portions of the data at the sending mobile phone MMP 100A; and (b) providing absent portions of the data from the receiving mobile phone MMP 100B; and in response to determining that the sending mobile phone MMP 100A does not possess the data or portions thereof, sending the data to the sending mobile phone MMP 100A.

Referring to FIG. 3A, in one embodiment of process 200, at block 204, DEC program 132A of MMP 100A executes transmission to MMP 100B of SMS inquiry 302 containing the identifier of data D1. At block 206, DEC program 132B of MMP 100B determines if memory 124B thereof contains the data corresponding to the identifier received in inquiry 302. In particular, DEC program 132B analyzes contents of data bank 130 for presence of data D1. If MMP 100B does not have data D1, DEC program 132B initiates transmission to MMP 100A of SMS response message 304 indicating that data D1 was not found at MMP 100B. This message is analyzed by DEC program 132A of MMP 100A that, at block 208, executes transmission to MMP 100B of message 306 containing data D1. Otherwise, if MMP 100B already has data D1, at block 210, DEC program 132B retrieves data D1 from data bank 130B and displays the data on display 102B of MMP 100B.

Referring to FIG. 3B, in another embodiment of process 200, at block 204, DEC program 132A of MMP 100A executes transmission of SMS inquiry 312 containing a checksum of the file containing data D1 to MS 310, which contains a registry of files stored in data banks 130 of MMPs 100 and, in particular, in data bank 130B of MMP 100B. At block 206, MS 310 forwards back to MMP 100A SMS response 314 to inquiry 312. This response is analyzed by DEC program 132A of MMP 100A. If MMP 100B does not have data D1, at block 208, DEC program 132A executes a transmission to MMP 100B of message 316 containing data D1. Otherwise, if data D1 already resides at MMP 100B, DEC program 132A initiates, at block 210, transmission to MMP 100B of SMS message 318. Message 318 prompts DEC program 132B to retrieve data D1 from data bank 130B and display the data on display 102B of MMP 100B.

During sequence 203, MMA 100A ("requesting party") requests multimedia data D2 from a website. Referring to FIG. 2B, sequence 203 begins at block 205 and proceeds to block 214, where MMP 100A transmits a request for downloading multimedia data D2 from the website. At block 216, a web server of the website determines a checksum of the file including the data D2 and then queries if MMP 100A already has the file. If the query is answered negatively, process 200 proceeds to block 218, in which the website forwards data D2 to MMP 100A. Otherwise, if the query is answered affirmatively, process 200 proceeds to block 220, in which DEC program 132A retrieves and displays data D2 on display 102B of MMP 100B, thus avoiding a redundant transmission of data D2 from web server 320 to MMP 100A. Upon completion of procedures of block 220, sequence 203 ends.

Referring to FIG. 3C, at block 214, MMP 100A transmits to MS 310 request 322 for obtaining multimedia data D2 from website 330, which is accessible via web server 320. MS 310 forwards, via interface 324, the request to web server 320. Web server 320 determines a checksum of the file including data D2 and communicates, via MS 310, inquiry 326 querying if MMP 100A already has a file having the same checksum. At block 216, DEC program 132A determines if such a file resides in data bank 130A. When the file is not found at MMP 100A, DEC program 132A initiates SMS response 328 to web server 320 and, at block 218, web server 320 forwards to MMP 100A multimedia message 332 including data D2 from website 330. Otherwise, when the file is found at MMP 100A, at block 220, DEC program 132A retrieves data D2 from data bank 130A and displays the data on display 102A.

In the flow chart in FIGS. 2A-2B, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be saved in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional multimedia mobile phone with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non-exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method, performed by a multimedia mobile device involving an outgoing transmission including graphical/video data, comprising:
   sending, to a receiving mobile device, an identifier of the data;
   determining, prior to sending the data to the receiving mobile device, that the receiving mobile phone does not contain a portion of the data;
   sending, to the receiving mobile phone, only the portion of the data not contained by the receiving mobile device;
   determining a checksum of a file of the data;
   transmitting, to a server containing a registry of files saved at the receiving mobile device, an inquiry regarding whether the receiving mobile device has a file having the same checksum; and
   receiving, from the server, a response to the inquiry, wherein
   the determining that the receiving mobile phone does not contain the portion of the data is based upon the response to the inquiry.

2. The method of claim 1, further comprising:
receiving a request, from the receiving mobile phone, for the data;
transmitting, to the receiving mobile device and in response to the request, an inquiry regarding availability of the data at the receiving mobile phone; and
receiving, from the receiving mobile phone and in response to the inquiry, information used to identify the portion of the data not contained by the receiving mobile device.

3. The method of claim 1, wherein
the identifier includes at least one of:
the checksum of the file of the data,
a name of the file of the data,
a template used to organize/format the data, and
a textual or symbolic description of the data.

4. The method of claim 1, wherein
the data includes at least one of:
digitized voice,
text,
graphics, and
video information.

5. The method of claim 1, wherein
at least a portion of the communications use Short Message Service (SMS) communication protocol.

6. A multimedia mobile device, comprising:
at least one processor, wherein the at least one processor is configured to perform and/or initiate involving an outgoing transmission including graphical/video data:
sending, to a receiving mobile device, an identifier of the data;
determining, prior to sending the data to the receiving mobile device, that the receiving mobile phone does not contain a portion of the data;
sending, to the receiving mobile phone, only the portion of the data not contained by the receiving mobile device;
determining a checksum of a file of the data;
transmitting, to a server containing a registry of files saved at the receiving mobile device, an inquiry regarding whether the receiving mobile device has a file having the same checksum; and
receiving, from the server, a response to the inquiry, wherein
the determining that the receiving mobile phone does not contain the portion of the data is based upon the response to the inquiry.

7. The device of claim 6, wherein the at least one processor is further configured to perform and/or initiate involving the outgoing transmission:
receiving a request, from the receiving mobile phone, for the data;
transmitting, to the receiving mobile device and in response to the request, an inquiry regarding availability of the data at the receiving mobile phone; and
receiving, from the receiving mobile phone and in response to the inquiry, information used to identify the portion of the data not contained by the receiving mobile device.

8. The device of claim 6, wherein
the identifier includes at least one of:
the checksum of the file of the data,
a name of the file of the data,
a template used to organize/format the data, and
a textual or symbolic description of the data.

9. The device of claim 6, wherein
the data includes at least one of:
digitized voice,
text,
graphics, and
video information.

10. The device of claim 6, wherein
at least a portion of the communications use Short Message Service (SMS) communication protocol.

11. A computer program product, comprising:
a computer usable storage medium having stored therein computer usable program code, the computer usable program code, which when executed by a multimedia mobile device, causes the multimedia mobile device to perform the following involved in an outgoing transmission including graphical/video data:
sending, to a receiving mobile device, an identifier of the data;
determining, prior to sending the data to the receiving mobile device, that the receiving mobile phone does not contain a portion of the data;
sending, to the receiving mobile phone, only the portion of the data not contained by the receiving mobile device;
determining a checksum of a file of the data;
transmitting, to a server containing a registry of files saved at the receiving mobile device, an inquiry regarding whether the receiving mobile device has a file having the same checksum; and
receiving, from the server, a response to the inquiry, wherein
the determining that the receiving mobile phone does not contain the portion of the data is based upon the response to the inquiry.

12. The computer program product of claim 11, wherein the computer usable program code further causes the multimedia mobile device to perform:
receiving a request, from the receiving mobile phone, for the data;
transmitting, to the receiving mobile device and in response to the request, an inquiry regarding availability of the data at the receiving mobile phone; and
receiving, from the receiving mobile phone and in response to the inquiry, information used to identify the portion of the data not contained by the receiving mobile device.

13. The computer program product of claim 11, wherein
the identifier includes at least one of:
the checksum of the file of the data,
a name of the file of the data,
a template used to organize/format the data, and
a textual or symbolic description of the data.

14. The computer program product of claim 11, wherein
the data includes at least one of:
digitized voice,
text,
graphics, and
video information.

15. The computer program product of claim 11, wherein
at least a portion of the communications use Short Message Service (SMS) communication protocol.

* * * * *